UNITED STATES PATENT OFFICE.

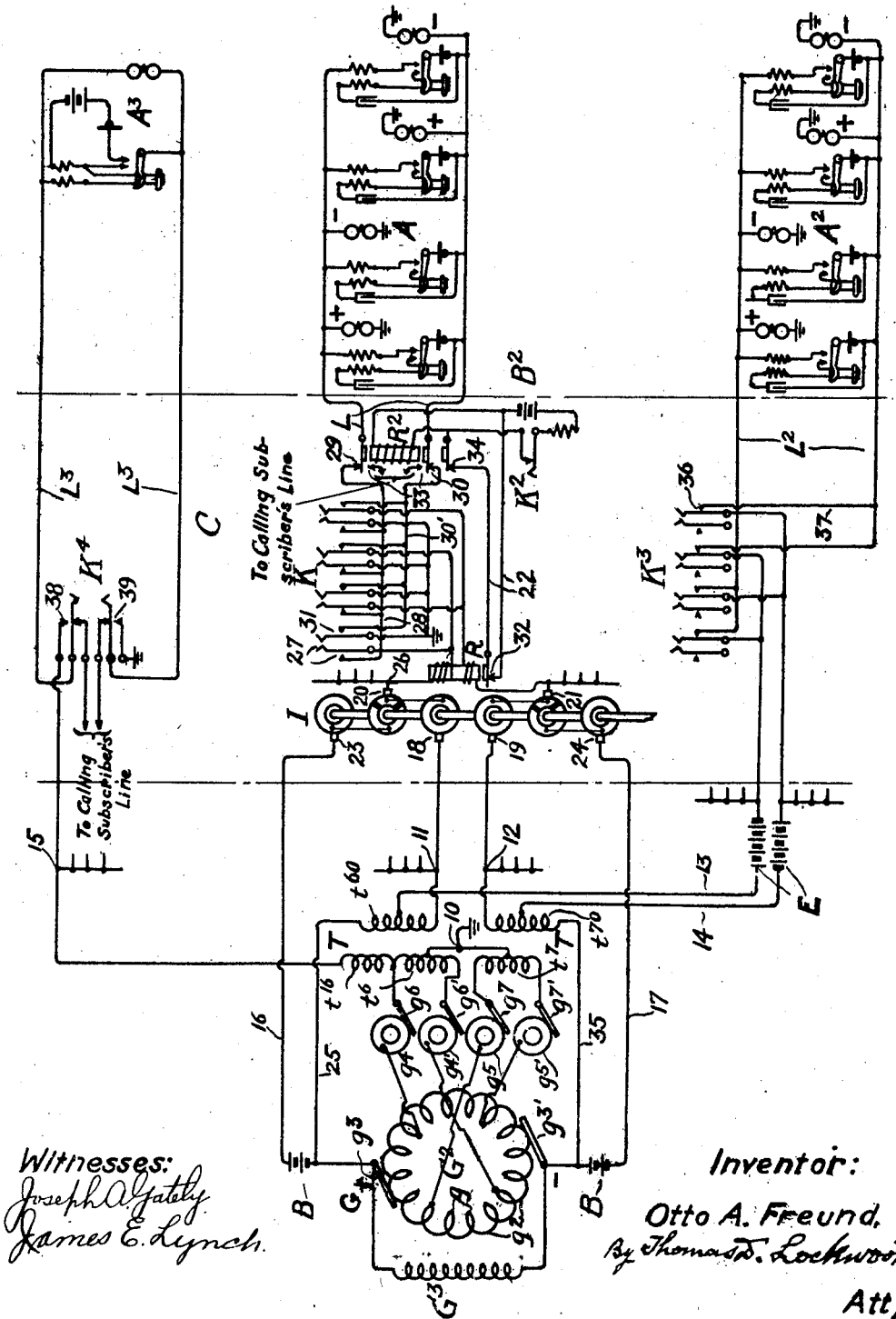

OTTO A. FREUND, OF NEW YORK, N. Y., ASSIGNOR TO AMERICAN TELEPHONE AND TELEGRAPH COMPANY, A CORPORATION OF NEW YORK.

SYSTEM OF GENERATING ELECTRICAL CURRENTS.

1,326,719.  Specification of Letters Patent.  Patented Dec. 30, 1919.

Application filed May 18, 1915. Serial No. 28,907.

*To all whom it may concern:*

Be it known that I, OTTO A. FREUND, residing at New York, in the county of New York and State of New York, have invented certain Improvements in Systems of Generating Electrical Currents, of which the following is a specification.

In electrical systems it frequently occurs that to perform the desired operations currents of different characters must be employed, as direct, alternating, and superimposed direct and alternating, some of which may be required to be of different polarities and at different voltages. An instance of this is found in telephone exchanges in which superimposed current of a certain voltage and of both polarities is used for selectively ringing the bells of party line stations, superimposed current of a less voltage and of both polarities for adjusting such bells, direct current for operating the controlling devices of machine ringing systems and alternating current of a higher voltage than the alternating current component of the superimposed current for ringing over toll and rural lines. The practice in such cases has been to furnish distinct sources of electrical energy from which the different currents might be derived. My invention effects substantial economies by providing a single source for two or more types of current with a minimum of accessory apparatus.

The accompanying drawing illustrates diagrammatically one embodiment of the invention in which currents for all the purposes previously indicated are obtained from a single generator, though it is to be understood that but a portion of these may be utilized and that the arrangement illustrated may be variously modified in accordance with the requirements.

At G appears a conventional representation of a dynamo electric generator having the usual rotatable armature $G^2$ with its coils $g$. These coils are joined to a like number of commutator segments $g^2$, at opposite points of which bear brushes $g^3$, $g^{3\prime}$ receiving therefrom direct current, this flowing from the brush $g^3$ through the external circuit and also through field windings $G^3$, of which there may be any suitable number, and returning by way of the brush $g^{3\prime}$. Collector rings $g^4$, $g^{4\prime}$, $g^5$, $g^{5\prime}$ also rotate with the armature and have coöperating brushes $g^6$, $g^{6\prime}$ and $g^7$, $g^{7\prime}$, respectively. In the form of the invention which I have chosen to illustrate there are four of these collector rings oppositely united in pairs to the armature coils, the connection being in quadrature. The alternating currents generated in the armature coils are transmitted to these collector brushes, and on account of the angular relation of the connections the phase of the currents which will flow through the pairs $g^6$, $g^{6\prime}$ and $g^7$, $g^{7\prime}$, will be different.

Each pair of collector brushes is joined to one of two primary windings $t^6$ and $t^7$ of a transformer or transformers T, the middle points of these windings being connected by a conductor 10 to ground or other common return conductor. With the primary windings of the transformer are inductively associated secondary windings $t^{60}$, $t^{70}$, the inner terminals of which are united to multiple leads 11 and 12 supplying external circuits, while the opposite terminals are connected respectively to the positive and negative commutator brushes $g^3$, $g^{3\prime}$.

Assuming grounded conductors to be attached to the leads 11 and 12, there will be a path for direct current generated in the armature $G^2$ by way of the positive and negative commutator brushes $g^3$, $g^{3\prime}$ through the secondary windings $t^{60}$ and $t^{70}$, at which alternating current of different phase is impressed upon the direct current, over the leads 11 and 12 and the external circuits to ground, through conductor 10 to the mid points of the primary windings $t^6$ and $t^7$, then through the halves of said windings and the pairs of collector brushes and rings in parallel to the armature coils. It will be seen that the windings $t^6$ and $t^7$ act not only as transformer primaries but also as reactance or balancing coils for a three-wire system, and since two of these coils are provided improved regulation is obtained because of the multiplicity of return paths for current in the neutral conductor. By so arranging the transformer as to supply superimposed current to the external circuits with the alternating current components in different phase better voltage regulation and improved generator capacity results, because when the load of one phase is at its maximum the other is at its minimum.

From any desired points between the extremities of the secondary windings $t^{60}$ and $t^{70}$, taps 13 and 14 may be led. This permits the obtaining of superimposed current with the alternating current component at a lower voltage than in the leads 11 and 12. If it is also desired to have the direct current component of less voltage than is generated by the armature $G^2$, a suitable number of counter electromotive force cells E may be included in these taps.

From either or both primary windings of the transformer alternating current alone may be obtained by furnishing auxiliary sections of these windings, as is shown in $t^{16}$ associated with the primary winding $t^6$. This section is in both conductive and induction relation to the main primary winding, and when properly proportioned may be caused to supply through multiple leads 15 alternating current at a voltage higher than that of the alternating current component of the superimosed current.

As the alternating current component is applied through the transformer secondaries independently to the superimposed current circuits at points between the commutator brushes and the external circuits, it is possible to take the positive and negative direct current components separately from said commutator brushes, these traversing leads 16 and 17, the external grounded circuits, and through conductor 10 and the transformer primaries as balancing coils to the generator, as do the superimposed currents. To perform their functions it may be necessary that these direct currents be of higher voltage than the direct current components delivered by the generator. In such cases batteries B properly poled may be included in series in the leads 16 and 17.

Specific utilizations of the invention will now be described.

The superimposed current leads 11 and 12 are shown connected by contacts 18 and 19 to a rotary interrupter I, such as is customarily employed in machine ringing in telephone systems and included in the equipment of a central station C. Other contacts 20 and 21 of the interrupter coöperate with segments conductively connected to the contacts 18 and 19, and determine the length of the ringing period, and with segments joined to other contacts 23 and 24 which receive direct current from the leads 16 and 17, respectively. Interrupter contacts 20 and 21 are united through the windings of a tripping relay R to contacts of a set of keys K located at an operator's position. The keys K also have contacts which, as illustrated, are joined to the opposite sides of a telephone line L through the back contacts of a ringing relay $R^2$. Upon this line are four substations A with their ringers united in pairs to ground from opposite sides. Each of the keys K corresponds to a particular substation, and the connections are such that upon the depression of any one of the keys its substation ringer will receive superimposed current with a direct current component of the polarity to which it is biased to respond. The winding of relay $R^2$ is supplied with current from a battery $B^2$ through a release key $K^2$. A short-circuit for the winding of relay $R^2$ is provided through conductor 22, one of its own back contacts and the back contact of relay R. A calling subscriber's line is indicated in association with the front contacts of relay $R^2$.

$L^2$ indicates a telephone line which may be precisely similar to the line L, and this is shown connected through a set of keys $K^3$, which may be situated at a central station test board, to the reduced voltage supply taps 13 and 14 to selectively operate the ringers of four substations $A^2$ by positive and negative superimposed currents over both sides of the line.

A third telephone line $L^3$ is illustrated, which may be considered a toll line having joined to its distant end telephone apparatus $A^3$. An operator's key $K^4$ at the central station C, when depressed, connects the alternating current lead 15 and ground to the sides of this line respectively to actuate the ringer at $A^3$. To the resting contacts of $K^4$ a calling subscriber's line appears connected.

Suppose in such an organization as has just been outlined the operator at the central station wishes to call the first substation upon the party line L, or that indicated at the left in the drawing, the ringer of which is biased to respond to positive current. Actuating the left hand key K, current will flow from the positive commutator brush $g^3$ of the generator, through conductor 25 and transformer secondary winding $t^{60}$ to lead 11. In the secondary winding alternating current of a particular phase is impressed upon the direct current by induction from the current delivered to primary winding $t^6$ by the collector brushes $g^6$, $g^{6'}$, so that positive superimposed current is supplied by the lead to the interrupter contact 18. When the ringing segment of the interrupter arrives at contact 20 this positive superimposed current will pass through conductor 26, a multiple of which leads to various sets of keys K, upper winding of tripping relay R, contact 27 of the actuated key K, conductor 28, back contact 29 of ringing relay $R^2$, one side of the line L, through the windings of the ringers at the two stations joined to this side of the line and by way of ground to conductor 10, halves of the primary windings $t^6$ and $t^7$ of transformer T and the collector brushes and rings in parallel to the armature of the generator. As the ringer at the second substation is biased for operation by negative current, that of the first substation only responds to signal the subscriber. Relay R is not energized by the current which traverses its winding at this time. The continued rotation of the interrupter brings the segment connected to the direct current lead 16 through contact 23 into coöperation with the contact 20. This results in a flow of direct current over the path just traced beyond the contact 20. Neither of the ringers through which this current passes operates, and the relay R remains inactive as before. Upon the subscriber at the signaled substation taking the receiver from its hook during either the ringing or silent period, a second path to ground is furnished for current through the primary winding of the induction coil, contacts of the switch hook, the transmitter, other side of the substation line, back contact 30 of relay R², conductor 30′ and contact 31 of the depressed key K. This increases the current in the winding of relay R sufficiently to energize it. At its contact 32 said relay opens the short circuit 22 of relay R². The latter breaks contacts 29 and 30, cutting off current which the key K applies to the line L, and at its front contacts 33 unites the calling and called lines. Contact 34 of relay R² severs the short-circuit 22, and thus locks said relay to battery B². Relay R² may be restored to its normal condition at the end of the conversation by the operation of release key K², which opens the path from battery B² through its winding, causing the short-circuit to be again closed at contact 34.

If it were desired to adjust the ringers of a party line of this character, such line would be connected to the keys K³. If, for example, the ringer at the last substation A², shown at the right of the drawing connected to the line L², were being adjusted the attendant at the test board would actuate the last of the set of ringing keys K³. The testing circuit would include the armature G² of the generator, negative commutator brush $g^{3\prime}$, conductor 35, a portion of the secondary winding $t^{70}$ of transformer T, tap 14, counter electromotive force cells E, contact 36 of depressed key K³, conductor 37, one side of the line L², winding of the ringer under adjustment and that joined to the same side of the line, ground, conductor 10, transformer primaries $t^6$ and $t^7$ and the collector brushes and rings in parallel. For the same reasons previously stated, superimposed current of a polarity adapted to operate the ringer at the last substation would traverse this circuit, but since there is a decreased inductive effect in the secondary section, and because of the presence of the counter electromotive force cells E, both the alternating and direct current components of this current will be of less voltage. By the use of such current the ringer may be effectively adjusted.

In ringing over the toll line L³, switched into coöperation with the key K⁴, this key is actuated by an operator at the central station C. Alternating current generated in the armature G² traverses the collector ring $g^4$, brush $g^6$, primary winding $t^6$ of the transformer T, brush $g^{6\prime}$ and its collector ring. Higher voltage alternating current than that induced in the secondary winding $t^{60}$ now flows from the primary winding section $t^{16}$ through lead 15, contact 38 of key K⁴, one side of the line L³, the winding of the ringer at station A³, the other side of the line, contact 39 of the key, ground and conductor 10 back to the primary winding $t^6$. The ringer is operated by this current. Release of the key K⁴ unites the calling and called lines.

I claim:

1. In combination, a multiple current generator, a signaling circuit including means responsive to superimposed currents and means responsive to components of said superimposed currents, and connections between said generator and said circuit, one of said connections being adapted to apply superimposed currents to said circuit to operate the first-named means and another of said connections being adapted to apply a component of said superimposed currents to said circuit to operate the second-named means.

2. In combination, a plurality of circuits provided with signaling devices responsive to currents of different character, a multiple current generator for supplying current to said circuits and including an armature, a commutator and a transformer adapted to be affected by potential variations in the armature, connections to said commutator through said transformer for superimposing alternating current and direct current components from said generator to operate signaling devices in one of said circuits, and separate connections to the commutator for supplying one of said components alone to the same circuit.

3. In combination, a plurality of circuits provided with signaling devices responsive to currents of different character, a multiple current generator for supplying current to said circuits and including an armature, a commutator and a transformer adapted to be affected by potential variations in the armature, connections to said commutator through said transformer for superimposing alternating current and direct current components from said generator to operate signaling devices in one of said circuits, separate connections to the commutator for supplying direct current components of said current to the same circuit, and connections between said other circuits and said transformer for supplying said circuits with component alternating currents.

4. In combination, a multiple current generator comprising an internal circuit, means for generating a substantially constant difference of potential between certain points in the circuit and a variable potential between other points, a transformer so arranged as to be affected by said potential variations, an external circuit, connections whereby said external circuit may be associated with said current potential points, one of said connections including both the primary and secondary of said transformer and another of said connections including the primary independent of the secondary.

5. In combination, a plurality of circuits provided with signaling devices responsive to currents of different character, a multiple current generator including an armature, a commutator and a plurality of transformers adapted to be affected by variation of potentials between points of the armature at different phases, connections to said commutators through said transformers for connecting certain of said circuits with said commutators, and separate connections between the same circuits and said commutators for supplying component currents to said circuits.

6. In combination, a plurality of circuits provided with signaling devices responsive to currents of different character, a multiple current generator including an armature, a commutator and a plurality of transformers adapted to be affected by variation of potentials between points of the armature at different phases, connections to said commutators through said transformers for connecting certain of said circuits with said commutators, separate connections between the same circuits and said commutators for supplying component currents to said circuits, and connections to one of said transformers for taking off alternating current components to operate devices in said other circuits.

7. An electrical generator having an armature, commutator and collector and brushes coöperating with the commutator and collector, external circuits including signaling devices, current supply conductors connecting the commutator brushes and external circuits, a common conductor from the external circuits to said collector, and connections for impressing the current from the collector brushes upon the supply conductors between the commutator brushes and said external circuits.

8. In combination, a plurality of circuits containing signaling devices, a generator of both alternating and direct current provided with an armature, a commutator and collector, and brushes coöperating with the commutator and collector, of a transformer having a primary winding connected to the collector brushes, and a secondary winding connected to a commutator brush, certain of said circuits being connected to different points in the secondary winding and another of said circuits being connected to a primary winding.

9. In combination, a plurality of circuits provided with signaling devices responsive to currents of different character, a multiple current generator having an armature, commutator and collector, and brushes coöperating with said commutator and collector; current supply conductors connecting the commutator brushes and certain of said circuits, a common conductor from the external circuits to the collector, and connections for impressing the current from the collector brushes upon certain other direct current supply conductors between the commutator brushes and said circuits.

10. In combination, a plurality of circuits including signaling devices, a generator of both alternating and direct current provided with an armature, a commutator and collector, and brushes coöperating with the commutator and collector, of a transformer having a primary winding connected to the collector brushes, a secondary winding connected to a commutator brush, one of said circuits being connected to both the primary and secondary windings of the transformer and having a separate connection with a commutator brush.

11. In combination, a plurality of circuits including signaling devices, a generator of both alternating and direct current provided with an armature, a commutator, a plurality of pairs of collector rings receiving current from the armature in different phases, and brushes coöperating with the commutator and collector rings, of a transformer having a primary winding connected to each pair of collector rings, a secondary winding associated with each primary winding, each of said secondary windings being connected to a commutator brush, certain of said circuits having connections with said brushes through said secondary windings and having separate connections with said brushes independently of said transformer, said circuits being connected to mid-points of said primary windings in parallel.

12. In combination, a plurality of circuits including signaling devices, a generator of both alternating and direct current provided with an armature, a commutator, a plurality of pairs of collector rings receiving current from the armature in different phases, and brushes coöperating with the commutator and collector rings, a transformer having a primary winding connected to each pair of collector rings, a secondary winding associated with each primary winding, each of said secondary windings being connected to a commutator brush, certain of said circuits having connections with said brushes through said secondary windings and having separate connections with said brushes independently of said transformer, and with mid-points of said primary windings in parallel, and another circuit connected to the secondary windings and to mid-points of said primary windings.

In testimony whereof, I have signed my name to this specification in the presence of two subscribing witnesses, this 14th day of May, 1915.

OTTO A. FREUND.

Witnesses:
 HARRY L. BROWN,
 SAMUEL RASMUSEN.